Figure 1:
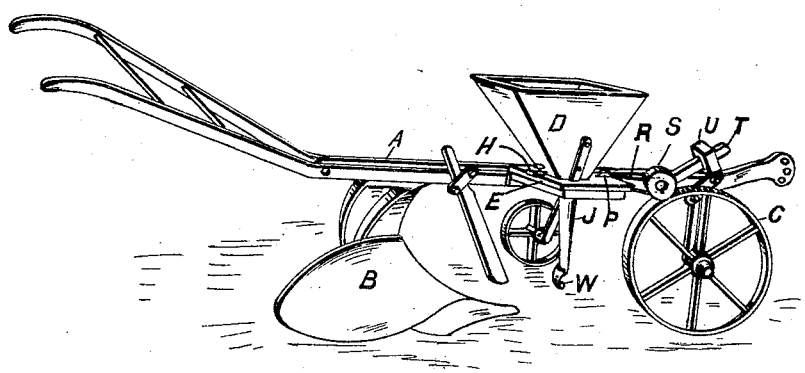

J. H. MORRIS.
SEED SOWING MACHINE.
APPLICATION FILED NOV. 30, 1908.

944,897.

Patented Dec. 28, 1909.

Witnesses

Inventor
James Henry Morris
by Georgie Measid
Attorneys

UNITED STATES PATENT OFFICE.

JAMES HENRY MORRIS, OF BINGARA, NEW SOUTH WALES, AUSTRALIA.

SEED-SOWING MACHINE.

944,897.  Specification of Letters Patent.  Patented Dec. 28, 1909.

Application filed November 30, 1908. Serial No. 465,166.

*To all whom it may concern:*

Be it known that I, JAMES HENRY MORRIS, a subject of the King of Great Britain and Ireland, residing at Bingara, in the State of New South Wales, Australia, have invented new and useful Improvements in Seed-Sowing Machines, of which the following is a specification.

My invention relates to apparatus for sowing wheat and other seed. It is usable in connection with any seed sowing apparatus in which the seed is carried in a box or reservoir and delivered therefrom by gravity through an aperture into one or more chutes through which it is directed to the ground.

My said invention consists particularly in novel means for maintaining a flow of seed and for arresting the flow of seed from the seed box, as required. Its advantages are the extreme simplicity and effectiveness of the device used for the said purpose, the low cost of the same, and the facility afforded for using a seed sowing attachment embodying the same in connection with a plow or other tilling implement.

When an aperture is made in the bottom of a box containing seed, the seed will bridge the said aperture and cease to run therethrough unless the dimensions of the aperture be considerable relative to the size of the seed; and if the aperture be subdivided by wires or the like set across it, the flow of seed will be further impeded thereby. If however the mass of seed be agitated above the aperture a current of seed will run through the aperture as long as the agitation is continued.

According to my invention, a seed box or reservoir of any form is used, and an oval round or rectangular aperture made in the bottom of said box or reservoir. A slide plate adjustable below said aperture serves to regulate the effective size of the same, so that any aperture from say one-tenth of a square inch to one square inch or more may be provided at will by moving the slide plate relatively to the aperture. Below the slide plate is a chute for directing the seed to the ground. The ends of the box are pierced in line with the aperture and close to the bottom plate to form bearings for a reciprocating feeder bar. This bar is in practice made of round steel about one quarter of an inch or less in diameter. At its middle part it is bent to zigzag curves in one plane, which bent part is located over the aperture; and it is provided with a driving attachment which may be conveniently operated from one of the wheels of the implement or vehicle on which the apparatus is carried. The size of the aperture being regulated by setting the slide plate to suit the particular seed which is being sown, there will be no flow of seed except when the feeder bar is reciprocated. When however the feeder bar is moved the seed bridge is broken, and as long as the motion of the bar is continued the seed continues to flow. The function of the zigzag is to break the seed bridge when the bar is moved, and so cause the seed to run through the aperture N.

In the accompanying drawings I have shown the apparatus fitted to a plow. The relative sizes and proportions of parts may be varied freely provided always that the size of the aperture is regulated proportionately to the size of seed being operated on and the rate of feed required. In the drawing the aperture and feeder rod are shown of disproportionately large size in order to make the structure and operation clear.

Figure 2:
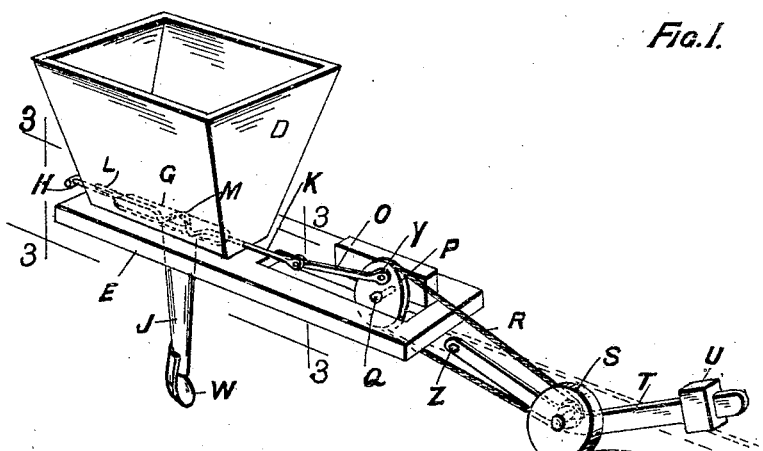
Figure 3:
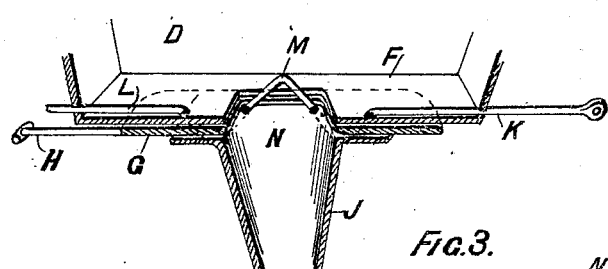
Figure 4:
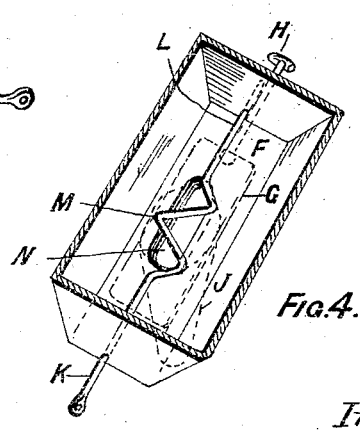

Figure 1 is a perspective side view of a plow carrying the seeder and the driving attachment; Fig. 2 a perspective view of the seeder removed from the implement or vehicle which carries it, but indicating by dotted lines a means for transmitting motion to the feeder; Fig. 3 a perspective section on the plane 3—3—3—3 Fig. 2; Fig. 4 a perspective plan of the box bottom, showing the seed aperture, the slide plate, and the feeder bar.

A is the frame, B the mold board, and C a wheel of the plow; D is the seed box, E a base board or plate carrying the box, F the box bottom, G the slide plate, H the rod by which the plate G is set, J the seed chute, K and L the ends of the feeder bar working through holes in the ends of the box D, M the zigzagged portion of the feeder bar which is arranged close to the bottom F, N the aperture in the bottom of the box D, O a rod connecting the end K of the feeder bar to the crank pin Y on the disk P which rotates on an arbor Q, R a band or light chain drive connecting the disks P and S, T a swinging arm centered at Z and weighted at U. The edge of the disk S runs on the rim of the wheel C and so conveys motion to the feeder bar K L M.

W is a seed directing shoe on the end of the chute J.

In operation, the slide plate is set to suit the seed with which the box is loaded, so that said seed will bridge the discharge aperture when the apparatus is at rest and run with sufficient freedom when the feeder bar is in motion. Upon the vehicle or implement upon which the apparatus is carried being moved, the feeder bar, which is substantially in contact with the bottom is reciprocated and seed runs freely through the chute to the ground as long as the movement is maintained.

Having thus fully described my invention, what I claim is:—

1. In a seed sower, the combination, with a seed box having a bottom provided with an unobstructed discharge opening, and means to reduce the opening to a size to be bridged by the seed in a state of rest, of a crooked feed bar arranged substantially in contact with the bottom and above the opening, and means to reciprocate said bar to agitate the seed to cause it to fall through the opening.

2. In a seed sower, the combination, with a vehicle, a seed box mounted thereon and having a bottom provided with an unobstructed seed discharge opening of a size to be bridged by the seed in a state of rest, of a crooked feed bar arranged close to the bottom and above the opening within the box, and a driving connection between the wheel of the vehicle and the bar to reciprocate the latter to agitate the seed to cause it to fall through said opening.

3. In a seed sower, the combination, with a vehicle, a seed box mounted thereon and having a bottom provided with an unobstructed seed discharge opening, and means to reduce the opening to a size to be bridged by the seed in a state of rest, of a crooked feed bar arranged close to the bottom and above the opening in the bottom, a crank disk having its crank pin connected to the bar, and a drive connection between the crank disk and the vehicle wheel whereby to reciprocate the feed bar when the vehicle is in motion to cause the seed to fall through the opening.

4. In a seed sower, the combination, with a vehicle, a seed box mounted thereon and having an unobstructed seed discharge opening, and means to reduce the opening to a size to be bridged by the seed in a state of rest, of a zigzag feed bar arranged above the opening within the box, a crank disk having its crank pin connected to the feed bar, a friction disk yieldingly held against a wheel of the vehicle, and a drive connection between the two disks whereby to reciprocate the feed bar to agitate the seed when the vehicle is in motion to cause the seed to fall through the opening.

In testimony whereof I have signed my name to this specification in the presence of two subscribing witnesses.

JAMES HENRY MORRIS.

Witnesses:
THOMAS DENIS RYAN,
ALFRED WILLIAM HOWARD BULL.